United States Patent
Kim et al.

(10) Patent No.: US 9,876,647 B2
(45) Date of Patent: Jan. 23, 2018

(54) APPARATUS FOR PROVIDING PUF-BASED HARDWARE OTP AND METHOD FOR AUTHENTICATING 2-FACTOR USING SAME

(71) Applicant: ICTK CO., LTD., Gyeonggi-do (KR)

(72) Inventors: Dong Kyue Kim, Seoul (KR); Byong Deok Choi, Seoul (KR); Dong Hyun Kim, Gyeonggi-do (KR); Kwang Hyun Jee, Gyeonggi-do (KR)

(73) Assignee: ICTK CO., LTD., Gyeonggi-do (KR)

( * ) Notice: Subject to any disclaimer, the term of this patent is extended or adjusted under 35 U.S.C. 154(b) by 51 days.

(21) Appl. No.: 14/786,079

(22) PCT Filed: Jan. 16, 2014

(86) PCT No.: PCT/KR2014/000454
§ 371 (c)(1),
(2) Date: Oct. 21, 2015

(87) PCT Pub. No.: WO2014/175538
PCT Pub. Date: Oct. 30, 2014

(65) Prior Publication Data
US 2016/0065378 A1 Mar. 3, 2016

(30) Foreign Application Priority Data

Apr. 22, 2013 (KR) .................. 10-2013-0043954

(51) Int. Cl.
*G06F 21/00* (2013.01)
*H04L 9/32* (2006.01)
*H04L 9/08* (2006.01)
*G06F 21/60* (2013.01)

(52) U.S. Cl.
CPC .......... *H04L 9/3278* (2013.01); *G06F 21/602* (2013.01); *H04L 9/0863* (2013.01); *H04L 9/0866* (2013.01); *H04L 9/0869* (2013.01); *H04L 9/3228* (2013.01); *H04L 2209/24* (2013.01)

(58) Field of Classification Search
None
See application file for complete search history.

(56) References Cited

U.S. PATENT DOCUMENTS

2012/0311320 A1* 12/2012 Brown ............... G06Q 20/3274
713/155

FOREIGN PATENT DOCUMENTS

| KR | 1020080009242 | 2/2008 |
| KR | 1020120112246 | 10/2012 |
| KR | 1020130019358 | 2/2013 |

OTHER PUBLICATIONS

International Search Report for International Application No. PCT/KR2014/000454, dated Apr. 21, 2014.
(Continued)

*Primary Examiner* — Brandon Hoffman
(74) *Attorney, Agent, or Firm* — Marshall, Gerstein & Borun LLP

(57) ABSTRACT

Provided is an apparatus for generating a hardware-based OTP which is impossible to duplicate. The apparatus for generating the OTP can comprise a PUF for generating a unique PIN. In addition, provided is a method which is used for 2-Factor authentication with the apparatus for generating the OTP and existing secure elements.

17 Claims, 15 Drawing Sheets

(56) References Cited

OTHER PUBLICATIONS

Written Opinion for International Application No. PCT/KR2014/000454, dated Apr. 22, 2014.
Extended European Search Report for Application 14789085.9, dated Nov. 21, 2016.
Raghavan Kumar et al.: "PHAP: Password Based Hardware Authentication Using PUFS", Microarchitecture Workshops (MICROW), 2012 45TH Annual IEEE/ACM International Symposium on, IEEE, Dec. 1, 2012, pp. 24-31, XP032339570, DOI: 10.1109/MICROW.2012.14, ISBN: 978-1-4673-4920-8.

* cited by examiner

US 9,876,647 B2

APPARATUS FOR PROVIDING PUF-BASED HARDWARE OTP AND METHOD FOR AUTHENTICATING 2-FACTOR USING SAME

TECHNICAL FIELD

The present invention relates to an apparatus for providing a one-time password (OTP) and an authentication method using the OTP and, more particularly, to an OTP providing apparatus and an authentication method to prevent a security attack.

BACKGROUND ART

With developments of mobile devices and information and communication technology, a common authentication provided through a secure element, hereinafter, also referred to as SE, such as a universal subscriber identity module (USIM), and a secure digital (SD) card, are increasingly being applied to an electronic payment.

However, the common SE may manage authentication means such as certificate authentications in a form of a file and thus, may a risk of accidents caused through replication of the certificate authentication or leakage of personal information. To minimize the risk, a one-time password (OTP) authentication may be performed using an existing OTP providing device of a user irrespective of a presence of the SE.

In general, an OTP providing apparatus may be provided in a form of, for example, an OTP token, a card type OTP terminal, and a USIM software-based OTP providing application.

However, the OTP providing device may be subject to be exposed to a security attack such as a debugging port and an internal memory attack. Also, the OTP providing device may also be vulnerable to software hacking on a terminal operating system (OS) and OTP applications.

Furthermore, when a security accident occurs in a certification authority or a service provider that provides electronic payment and mobile banking services, an issue that financial institutions being unable to avoid responsibility for illegal transactions based on leaked information may arise.

Conversely, a physically unclonable function (PUF) may provide an unpredictable digital value. Each PUF may provide a different digital value although the PUF is produced through the exactly same manufacturing process.

The PUF may also be referred to as, for example, a physical one-way function (POWF) practically impossible to be duplicated.

Due to the impossibility of replication, the PUF may be used as an identifier of a device for security and/or authentication. For example, the PUF may be used to provide a unique key for distinguishing a device from other devices.

The method of implementing a PUF, Korea Patent No. 10-1139630, hereinafter, referred to as the '630 patent, may be provided in advance. The '630 patent provides a method of stochastically determining whether a via or an inter-layer contact between conductive layers of a semiconductor based on a process variation of the semiconductor.

DISCLOSURE OF INVENTION

Technical Solutions

According to an aspect of the present invention, there is provided a 2-factor authentication apparatus including a secure element (SE) to perform a first authentication process, and a hardware-based one-time password (OTP) generation element including a physically unclonable function (PUF) to generate an OTP and perform a second authentication process, the hardware-based OTP generation element also being referred to as, for example, an HW OTP element and an HW OTP.

The hardware-based OTP generation element may be disposed on a chip separate from the secure elements to have a die-chip wiring with the secure element, and transmit the OTP externally through an input and output interface of the secure elements.

The hardware-based OTP generation element may receive a random number R encrypted using a public key of the OTP element from a certificate authority (CA).

In this case, the hardware-based OTP generation element may decrypt the random number R using a private key corresponding to the public key and generated based on the PUF, and generate the OTP using the decrypted random number R.

When the public key is transmitted to the certificate authority, the hardware-based OTP generation element may encrypt the public key using a PUF-personal identification number (PIN) differing from the PUF and transmits the encrypted public key.

The hardware-based OTP generation element may include a blocker used to extract the PUF-PIN before the authentication apparatus performs the second authentication process and be physically blocked after the extracting such that the PUF-PIN is not re-extracted.

The authentication apparatus may be implemented in at least one of a subscriber identification module (SIM), a storing medium, and an internal chip of a terminal device. Also, the secure element may provide a security storage to store at least one item of security information related to the first authentication.

The security information may include at least one of an authentication certificate, a password, and subscriber identification information.

The second authentication may relate to a submission of the OTP requested from at least one of a trusted service manager (TSM), a mobile network operator (MNO), a contents provider, and a service provider.

At least one of a first authentication and a second authentication is performed in connection with at least one of a mobile credit card payment, an electronic wallet payment, a mobile banking, an in-app store purchase payment, a content purchase payment, a website login, and a cloud computing service login.

According to another aspect of the present invention, there is also provided a hardware-based OTP generation apparatus using a PUF, the apparatus including a first PUF to provide a private key, a public key generator to generate a public key using the private key, a second PUF to provide a PIN for identifying the apparatus, an encryptor to encrypt the public key using the PIN and provide the encrypted public key, a decryptor to decrypt, using the private key, a random number received through an encryption performed using the public key, and an OTP generator to generate an OTP corresponding to the random number in response to a decryption of the random number.

The PIN may be used to decrypt the public key. Also, the hardware-based OTP generation apparatus may further include a blocker used to initially extract the PIN and is physically blocked after the PIN is initially extracted such that the PIN is not exposed externally.

According to still another aspect of the present invention, there is also provided a hardware-based OTP generation apparatus using a PUF, the apparatus including a PUF to provide a PIN for identifying the apparatus, a storage to store time information synchronized with an external source, and an OTP generator to generate, in response to an OTP provision request, an OTP corresponding to the time information based on the PIN and the time information.

According to yet another aspect of the present invention, there is also provided an authentication method including transmitting, in response to an OTP provision request for a second authentication process differing from a first authentication process performed by a secure element, the OTP provision request from the secure element to a hardware-based OTP generation element which includes PUF and is provided as a single package through a die-chip wiring with the secure element, generating, by the hardware-based OTP generation element, an OTP using the PUF and transmitting the OTP to the secure element, and externally providing, by the secure element, the OTP through an input and output interface of the secure element.

According to further another aspect of the present invention, there is also provided an authentication method for providing an OTP using a hardware-based OTP generation apparatus based on a PUF, the method including generating a public key using a private key generated by a first PUF, providing, by a second PUF, a PIN for identifying the hardware-based OTP generation apparatus, encrypting, by an encryptor, the public key using the PIN and providing the encrypted key, decrypting, by a decryptor, using the private key, a random number received through an encryption based on the public key, and generating, by an OTP generator, an OTP corresponding to the random number in response to a decryption of the random number.

According to still another aspect of the present invention, there is also provided an authentication method for providing an OTP using a hardware-based OTP generation apparatus based on a PUF, the method including generating, by a PUF, a PIN for identifying the hardware-based OTP generation apparatus, and generating, an OTP generator, an OTP corresponding to time information synchronized with an external source based on the PIN and the time information in response to an OTP provision request.

BEST MODE FOR CARRYING OUT THE INVENTION

Figure 1:
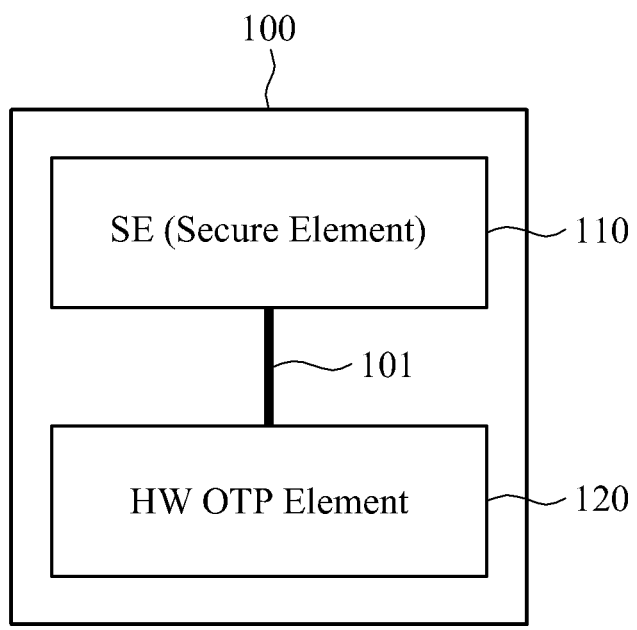
FIG. 1 is a block diagram illustrating a 2-factor authentication apparatus including a general secure element (SE) and a hardware-based one-time password (OTP) providing apparatus according to an example embodiment.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a 2-factor authentication apparatus 100 including a general secure element (SE) and a hardware-based one-time password (OTP) providing apparatus according to an example embodiment.

As an example, the 2-factor authentication apparatus 100 may be included in at least a portion of an embedded SE of a hardware terminal, a storing medium, a subscriber identification module (SIM), and a smart card. Related descriptions will be provided with reference to FIGS. 2 and 3.

The 2-factor authentication apparatus 100 may include an SE 110 to perform a first authentication process which is an authentication scheme widely used in general.

Here, the first authentication process may be, for example, an authentication process based on a password, a subscriber identifier, a user identification (ID), and an authentication certificate stored in the SE 110.

In a typical electronic payment and mobile banking, the first authentication process may be performed using the SE 110 to authenticate a user and/or a device. Alternatively, a process of identifying an OTP value by an OTP device provided separately and/or an authentication certificate password or a digital signature.

The 2-factor authentication apparatus 100 may also include a hardware-based (HW) OTP element 120. In this disclosure, an OTP authentication process performed relatively to and/or independently of the first authentication process may also be referred to as, for example, a second authentication process.

A second authentication may be related to an OTP submission process requested from at least one of, for example, a trusted service manager (TSM), a mobile network operator (MNO), a contents provider, and a service provider.

Also, at least one of the first authentication and the second authentication may be related to at least one of, for example, a mobile credit card payment, an electronic wallet payment, a mobile banking, an in-app store purchase payment, a content purchase payment, a website login, and a cloud computing service login.

In an example, the HW OTP element 120 may be included in a single chip including the SE 110.

Although the foregoing example describes that each of the SE 110 and the HW OTP 120 is included in a corresponding chip, the SE 110 and the HW OTP element 120 may be included in a single package. The SE 110 may be connected with the HW OTP element 120 is through a die-chip wiring.

In this example, an interface for external access to the HW OTP element 120 may be omitted. An access to the HW OTP element 120 may be allowed through only the SE 110 and thus, an attack route may be blocked.

In an example, in contrast to typical OTP providing apparatuses, the HW OTP element 120 may implement a key value used directly or in directly to generate an OTP value only through hardware in lieu of storing the key value in a non-volatile storage medium.

In an example, the HW OTP element 120 may include at least one PUF, and use at least a portion of the at least one PUF to generate the OTP value.

As an example, the PUF included in the HW OTP element 120 may be based on a process variation proposed in the '630 patent as described above. However, the foregoing may be provided as an example and thus, another hardware configuration for generating a key value, for example, a digital value applied directly or indirectly to an OTP generation, through hardware based on the PUF may also be applicable thereto.

By implementing the HW OTP element 120 through hardware, for example, the PUF, vulnerability against a physical attack and replication may be enhanced. Accordingly, a safety of the authentication process may be ensured against a secure attack.

Also, when the HW OTP element 120 is implemented only through a hardware circuit and does not include a processing module, for example, a central processing unit (CPU) and a main chip unit (MCU), to process software, a system may be unchangeable in contrast to software and thus, a high-reliability and unmodulatable authentication process may be provided.

Descriptions related to the HW OTP element 120 including the PUF and OTP generation will be provided as an example with reference to FIGS. 4, 7, 14, and 15.

Figure 2:
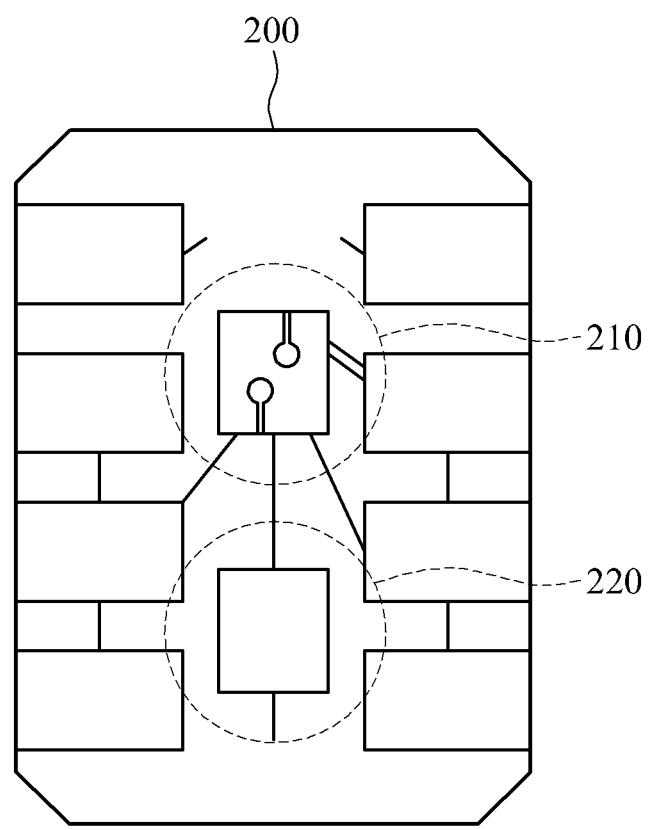
FIG. 2 illustrates an example of one package including a chip corresponding to a hardware-based (HW) OTP element and a chip corresponding to an SE of FIG. 1.

FIG. 2 illustrates a package 200 including a chip corresponding to the HW OTP element 120 and a chip corresponding to the SE 120 of FIG. 1.

As an authenticating element included in the package 200, the SE 210 may be used to perform a first authentication process based on a typical method. In an example, the package 200 may include an HW OTP element 220 having a die-chip wiring with the SE 210.

The aforementioned configuration may guarantee a compatibility of the package 200 with an authentication process based on general technology including the SE 210.

For example, although the package 200 includes the SE 210 and the HW OTP element 220, the package 200 may function as a chip performing the first authentication through the SW 210 similarly to a typical process when a second authentication by the HW OTP element 220 is not requested during an authentication process.

Also, since a manufacturing process of the package 200 is similar or identical to a general chip manufacturing process, the HW OTP element 220 may be included in a chip as a package, thereby minimizing a complexity in the manufacturing process.

The HW OTP element 220 may not directly display the generated OTP to be viewed by the user based on a scheme used by the typical OTP providing apparatus, and may transfer the generated OTP to the SE 210 such that the second authentication is performed seamlessly. In this example, the SE 210 may also safely encrypt the OTP received from the HW OTP element 220 and transfer the encrypted OTP externally. As described with reference to FIG. 4, in an example, the HW OTP element 220 may display the generated OTP to be viewed by the user based on a different scheme.

Figure 3:
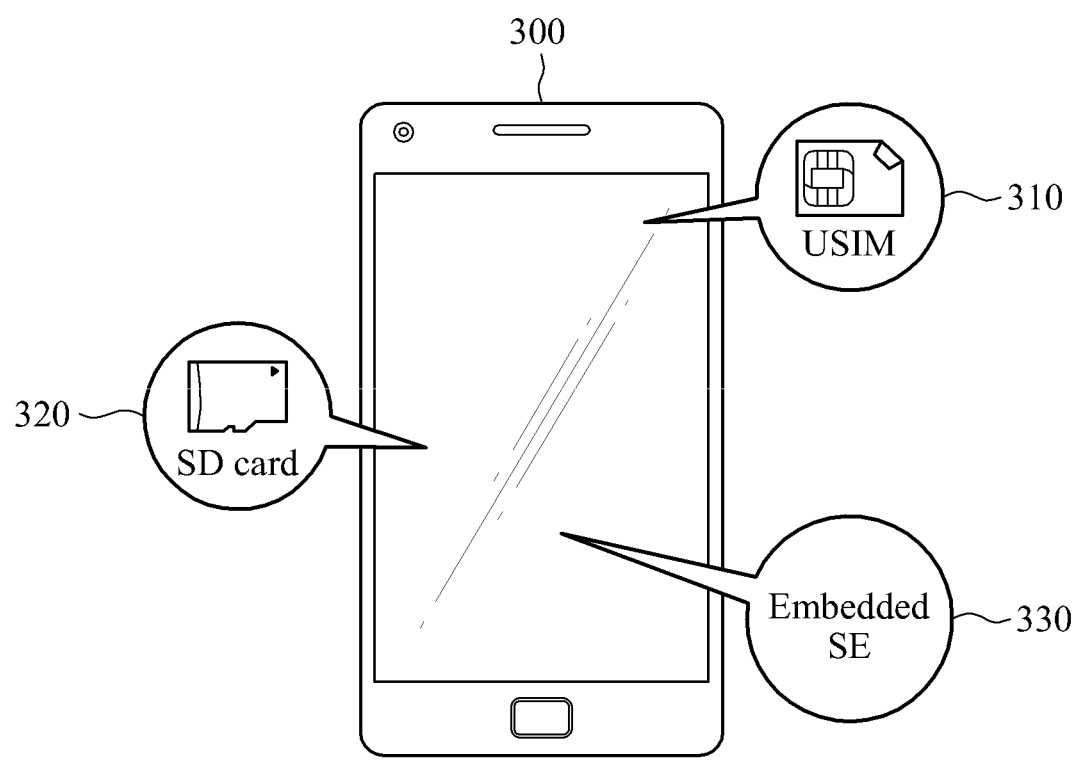
FIG. 3 is a diagram illustrating various examples to which an authentication apparatus of FIG. 1 is applied.

FIG. 3 is a diagram illustrating various examples to which an authentication apparatus of FIG. 1 is applied.

The 2-Factor authentication apparatus 100 of FIG. 1 and the package 200 of FIG. 2 may be included in a various types of products. In general, an SE may be included in a universal subscriber identity module (USIM) or a secure digital (SD) card. Similarly, the 2-factor authentication apparatus 100 or the package 200 may be included in a USIM 310 or an SD card 320.

Additionally, the 2-factor authentication apparatus 100 or the package 200 may be provided in a form of an embedded secure element 330 included in an information and communications terminal 300 in manufacturing of the information and communications terminal 300, for example, a smartphone.

Figure 4:
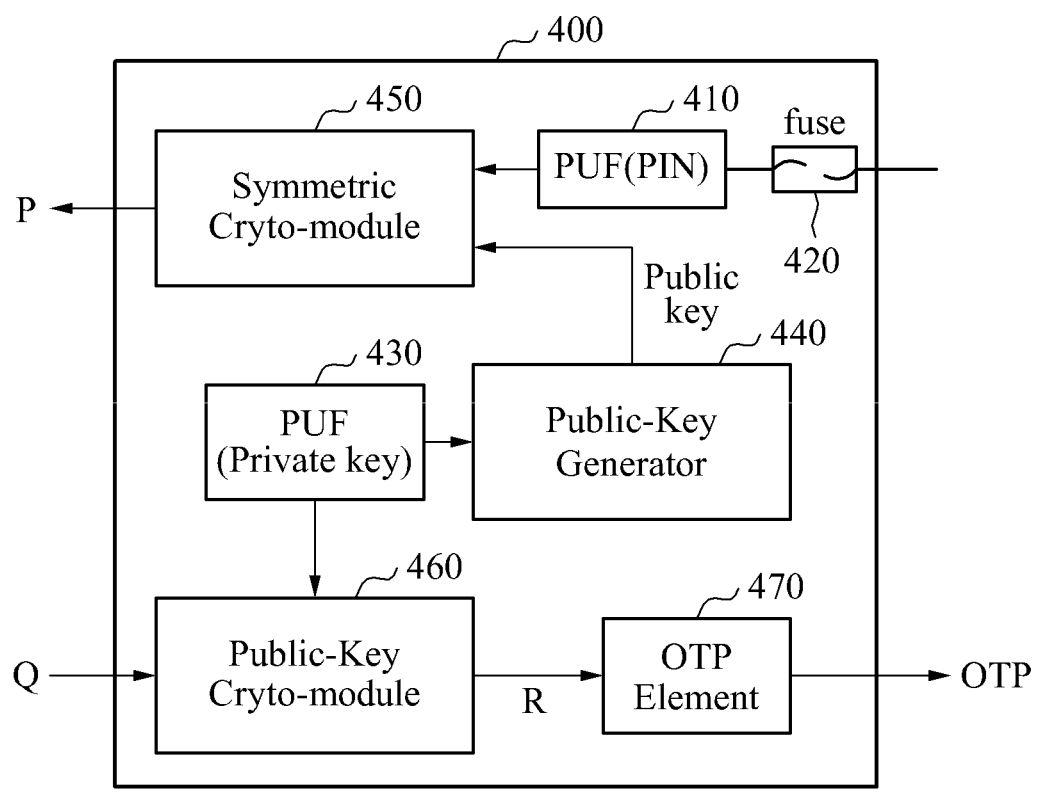
FIG. 4 illustrates an example of an HW OTP providing apparatus according to an example embodiment.

FIG. 4 illustrates an HW OTP providing apparatus 400 according to an example embodiment.

In an example, an HW OTP providing apparatus 400 may correspond to the aforementioned HW OTP element, for example, the HW OTP element 120 and the HW OTP element 220. In another example, the HW OTP providing apparatus may be an OTP providing apparatus implemented through hardware irrespective of a 2-factor authentication.

Thus, hereinafter, for increased clarity and conciseness, descriptions related to a configuration and an operation of the HW OTP providing apparatus 400 will be provided based on an example in which the HW OTP providing apparatus is an OTP element included in a 2-factor authentication apparatus or an example in which the HW OTP providing apparatus is a separate OTP providing apparatus. However, it is apparent that one of the examples is not excluded from this disclosure.

In an example, the HW OTP providing apparatus 400 may include a first PUF 430 to generate a private key such that a public key-private key based encryption and decryption is to be performed with an external CA. Hereinafter, the HW OTP providing apparatus 400 may also be referred to as, for example, the apparatus 400.

Also, the HW OTP providing apparatus 400 may include a second PUF to generate a unique PIN for identifying the 400. In this disclosure, the first PUF 430 may also be referred to as, for example, "PUF(private key)". The second PUF may also be referred to as, for example, "PUF(PIN)".

The HW OTP providing apparatus 400 may include a blocker 420. The blocker 420 may function as a route through which a unique PIN for identifying the apparatus 400 is safely extracted before the apparatus 400 is distributed and/or utilized. The blocker 420 may be configured to physically block a PIN extraction route, for example, PIN_out after the PIN is initially extracted in a safe state, and may be implemented using a fuse as illustrate herein.

A public key generator 440 may generate a public key symmetric to the private key generated by the PUF(private key) based on the private key. When the public key is to be transmitted to an external CA, a symmetric-key based encryption module 450 may generate P by encrypting the public key using the PIN generated by the PUF(PIN) 410 as a key value such that P is transmitted to the external CA. In an example of a 2-factor authentication apparatus illustrated in FIG. 1, P may be transmitted through the SE 110.

In response to a request for an OTP authentication process based on a challenge-response scheme, the external CA may transmit Q obtained by encrypting a random number, R corresponding to a challenge to the apparatus 400.

Q obtained by encrypting R based on a unique public key of the apparatus 400 may be demodulated using the private key. Thus, a demodulation module 460 may demodulate Q using the private key, thereby restoring R corresponding to the challenge.

An OTP generator 470 may generate an OTP based on R.

When the OTP is transmitted to the external CA, the external CA may perform the OTP authentication process by verifying whether the received OTP matches an OTP generated by the external CA based on R.

Figure 5:
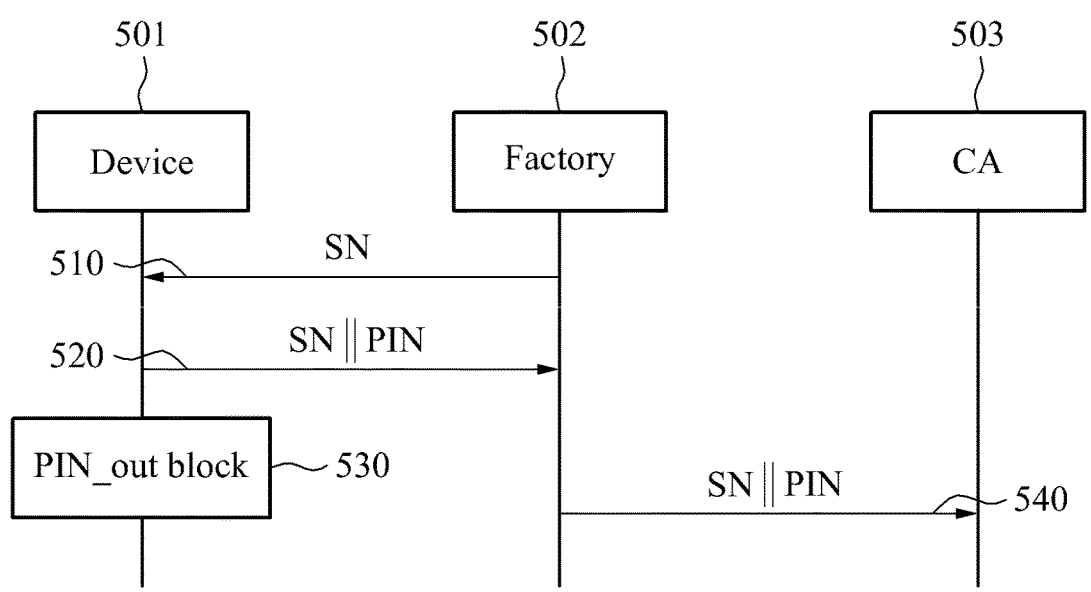
FIG. 5 is a flowchart illustrating a process of initially extracting a personal identification number (PIN) in an HW OTP providing apparatus according to an example embodiment.
Figure 6:
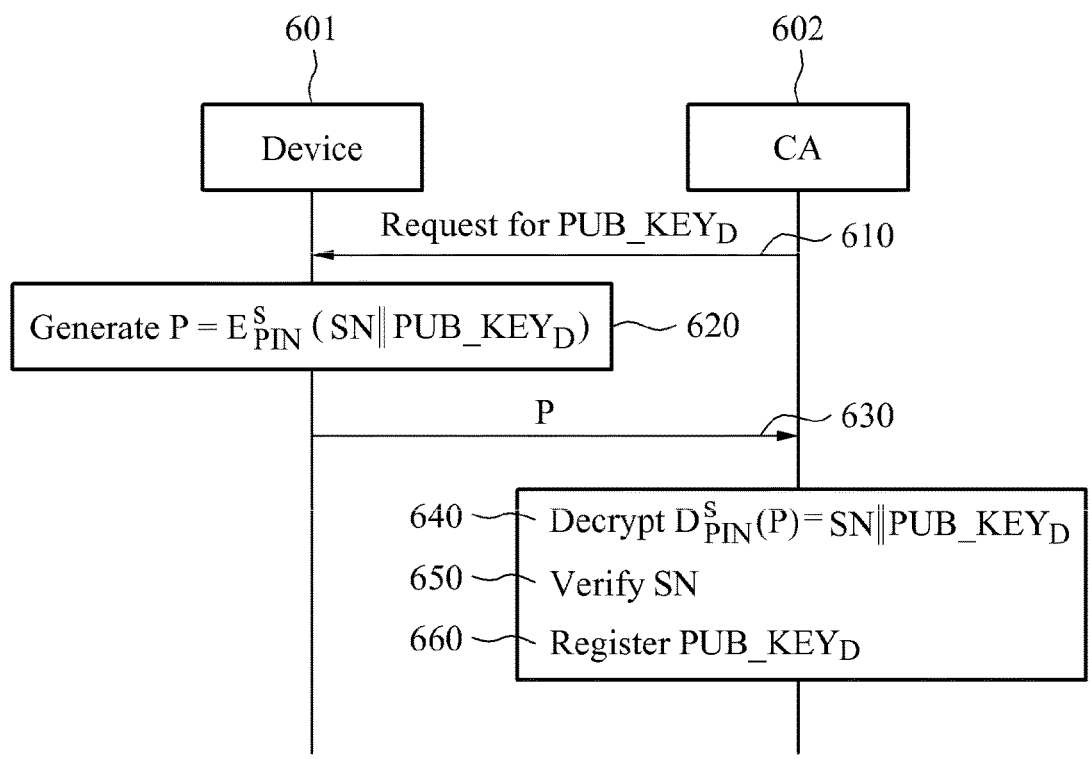
FIG. 6 is a flowchart illustrating a process of exchanging a public key between an HW OTP providing apparatus and a certificate authority (CA) according to an example embodiment.
Figure 7:
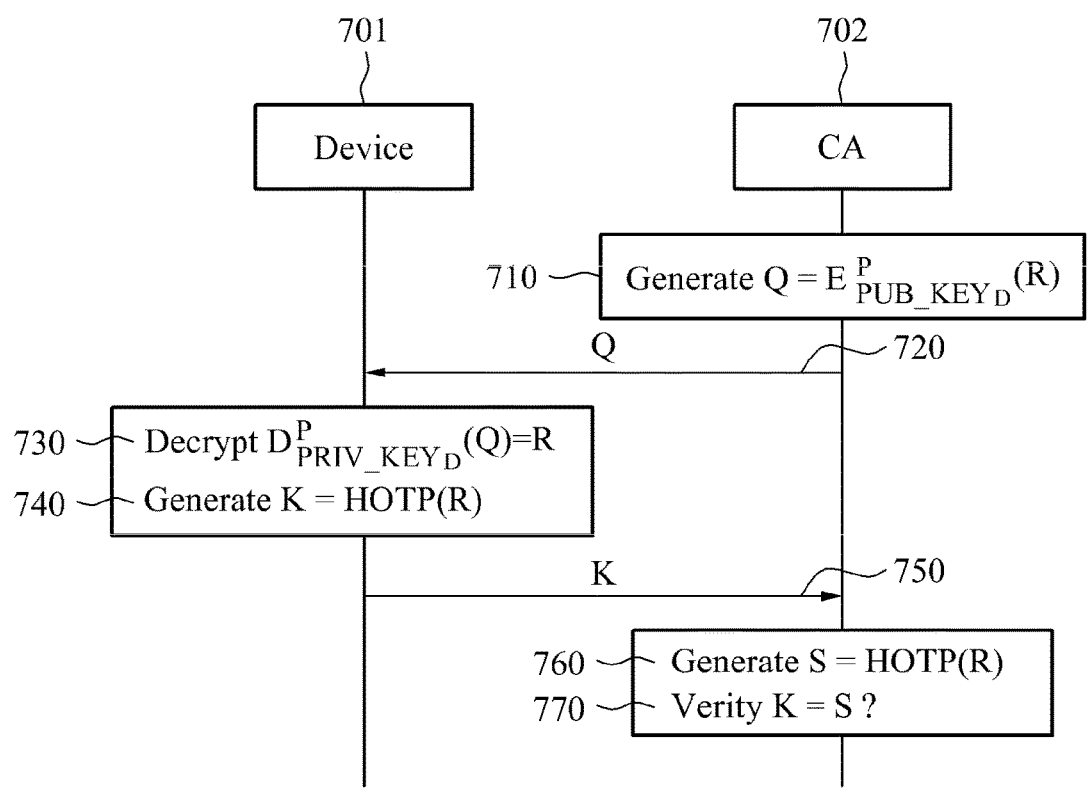
FIG. 7 is a flowchart illustrating a process of generating an OTP in an HW OTP providing apparatus and authenticating the generated OTP in a CA according to an example embodiment.

Related descriptions will also be provided with reference to FIGS. 5 through 7.

FIG. 5 is a flowchart illustrating a process of initially extracting a PIN in an HW OTP providing apparatus according to an example embodiment.

In operation 510, a serial number, SN, of a device 501 may be assigned to the device 501 in a factory 502 for manufacturing the device 501. The device 501 may include PUF(PIN). In operation 520, a PIN generated by the PUF (PIN) may be initially extracted and provided to the factory 502 with SN.

In operation 530, the blocker, for example, the fuse, as described with reference to FIG. 4 may be physically shorted to block PIN_out.

In operation 540, the factory 502 may provide SN and PIN to a CA 503 through a safe process. The CA 503 may manage SN and PIN through a matching.

The foregoing is provided as an example and thus, the CA 503 may perform the process performed in the factory 502 when SN||PIN is to be transmitted to the CA 503 with an increased safety. Hereinafter, the factory 502 and the CA 503 may perform at least a portion of function of one another and thus, repeated descriptions will be omitted.

FIG. 6 is a flowchart illustrating a process of exchanging a public key between an HW OTP providing apparatus and a CA according to an example embodiment.

Public key exchanging process may be performed between a device 601 and a CA 602 in advance of an OTP authentication.

In operation 610, the CA 602 may send a request for a public key $PUB\_KEY_D$ to the device 601. In operation 620, in response to the request, the device 601 may generate P by encrypting SN and the public key $PUB\_KEY_D$ based on a symmetric-key based encryption scheme using a PIN of the device 601.

In operation 630, P may be transmitted to the CA 602. In operation 640, the CA 602 may demodulate P using the PIN of the device 601 previously acquired in operation 540 of FIG. 5.

In operation 650, verification on SN may be performed. When a verification result is normal, in operation 660, the public key $PUB\_KEY_D$ may be registered to be used in a subsequent OTP authentication process. During the aforementioned process, a private key of the device 601 may not be extracted by the CA 602. Also, since the private key of the device 601 is not externally exposed in any case, only the device 601 may be allowed to demodulate data encrypted using the public key $PUB\_KEY_D$.

Also, a self-replication of the device 601 based on the PUF may be impossible. When the public key $PUB\_KEY_D$ of the device 601 is exposed from the CA 602 due to secure attack, or PIN is exposed, a device 691 other than the public key $PUB\_KEY_D$, for example, a device pretending to function as the device 601 may demodulate the data encrypted using the public key $PUB\_KEY_D$.

Accordingly, despite a security incident occurring at an end of the CA 602, the CA 602 may not responsible for a payment transaction in which the encrypted data is successfully demodulated using the public key $PUB\_KEY_D$ of the device 601.

FIG. 7 is a flowchart illustrating a process of generating an OTP in an HW OTP providing apparatus and authenticating the generated OTP in a CA according to an example embodiment.

When a CA 702 is to authenticate a device 701, the CA 702 may generate a random number, R corresponding to a challenge in a challenge-response scheme, and generate Q by encrypting R using a public key $PUB\_KEY_D$ of the device 701.

In operation 720, the CA 702 may transmit Q to the device 701. In operation 730, the device 701 may restore Q by demodulating Q using a private key $PRIV\_KEY_D$ of the device 701.

In operation 740, the device 701 may generate an OTP K using a predetermined method by providing R to an OTP generation module, for example, a module based on a hash type OTP generation algorithm processing.

In operation 750 the generated OTP K may be provided to the CA 702. In this example, the OTP K may be provided through an encryption based on a safe scheme. As an example, when the device 701 previously acquires a public key $PUB\_KEY_{CA}$ of the CA 702, the OTP K may be provided by encrypting an OTP using the public key $PUB\_KEY_{CA}$.

Alternatively, based on a 2-factor authentication method described with reference to FIG. 1, the SE 110 may provide K generated by the HW OTP element 120 to the CA 702 based on an encryption scheme of the SE 110.

In operation 760, the CA 702 may generate an OTP value, S by using R based on the same scheme as that of the device 701. In operation 770, the CA 702 may verify whether S generated by the CA 702 is the same as K provided from the device 701, thereby performing an OTP authentication process.

As described above, since Q is obtained by encrypting R transmitted from the CA 702 using the public key $PUB\_KEY_D$ of the device 701, an object other than the device 701 having the private key $PRIV\_KEY_D$ that is not exposed externally may not be allowed to demodulate Q and restore R. Accordingly, in a case in which the public key $PUB\_KEY_D$ is exposed by the CA 702, the CA 702 may not responsible for restoration of R using the private key $PRIV\_KEY_D$ and a transaction denied for this reason.

The aforementioned descriptions related to the OTP authentication process based on the challenge-response scheme are provided as an example and thus, an OTP authentication may be performed through various processes based on an implementation of an HW OTP providing apparatus. As a related example, a time-synchronization based OTP authentication will be described with reference to FIGS. 14 and 15.

Figure 8:
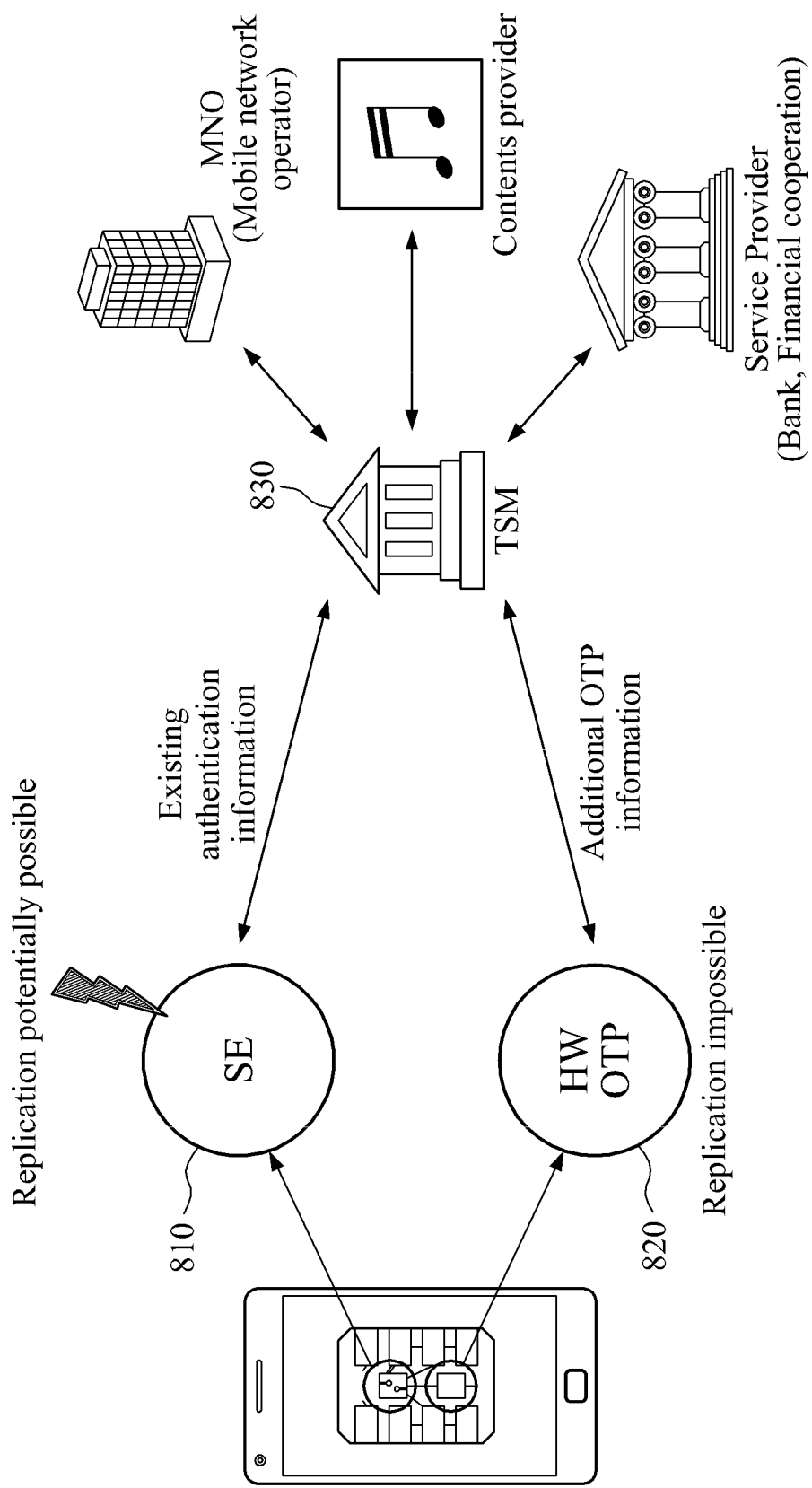
FIG. 8 illustrates an example of comparison between an authentication process of a 2-factor authentication apparatus and a general authentication process according to an example embodiment.

FIG. 8 illustrates an example of comparison between an authentication process of a 2-factor authentication apparatus and a general authentication process according to an example embodiment.

In general, a terminal and/or user authentication may be performed by only an SE 810 based on a 1-factor authentication. For this reason, various secure risks, for example, a certificate authentication file leakage, illegal re-issue of certificate authentications, a password leakage, screen or keyboard hacking may potentially exist.

Although the OTP authentication is performed separately from the SE 810, an OTP device may be implemented through software and thus, hacking risks may exist. Alternatively, since a key and data used in OTP generation are recorded in a storage medium, risks of OTP replication may also exist.

As described with reference to FIG. 1, since a first authentication is performed by the SE 810 and a second authentication is performed by a PUF based HW OTP 820 that is not replicable and implemented with the SE 810, a secure attack may not affect a 2-factor authentication.

Accordingly, a high level of authentication reliability may be provided to commercial/financial transaction subjects and a TSM 830 managing future electronic commercial or financial transactions.

Figure 9:
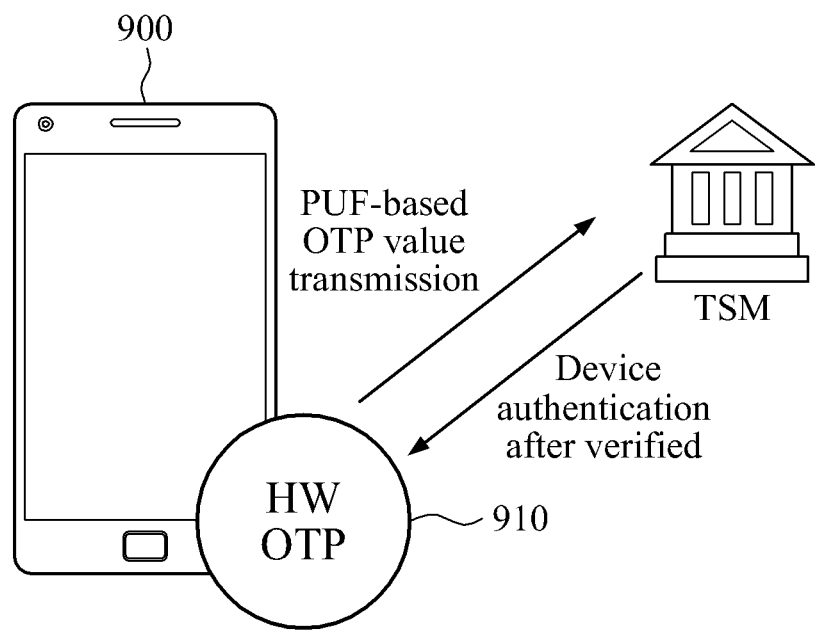
FIG. 9 illustrates an example of an HW OTP authentication process according to an example embodiment.

FIG. 9 illustrates an example of an HW OTP authentication process according to an example embodiment.

A user/terminal authentication performed by an HW OTP 910 may not be based on a successful authentication performed by the SE 810 using a typical scheme described with reference to FIG. 8.

Depending on an example, an authentication process may be performed at a high level through an OTP authentication of the HW OTP 910 included in a terminal 900 and an external institute.

Thus, the authentication may be performed by only the HW OTP when a subject of electronic commerce/financial transaction or a TSM requires an authentication of the HW OTP 910. When the HW OTP 910 transmits a PUF-based OTP, the TSM may authenticate the terminal 900 by verifying the OTP.

Accordingly, it is apparently understood that example embodiments are not limited to an example of the 2-factor authentication.

Figure 10:
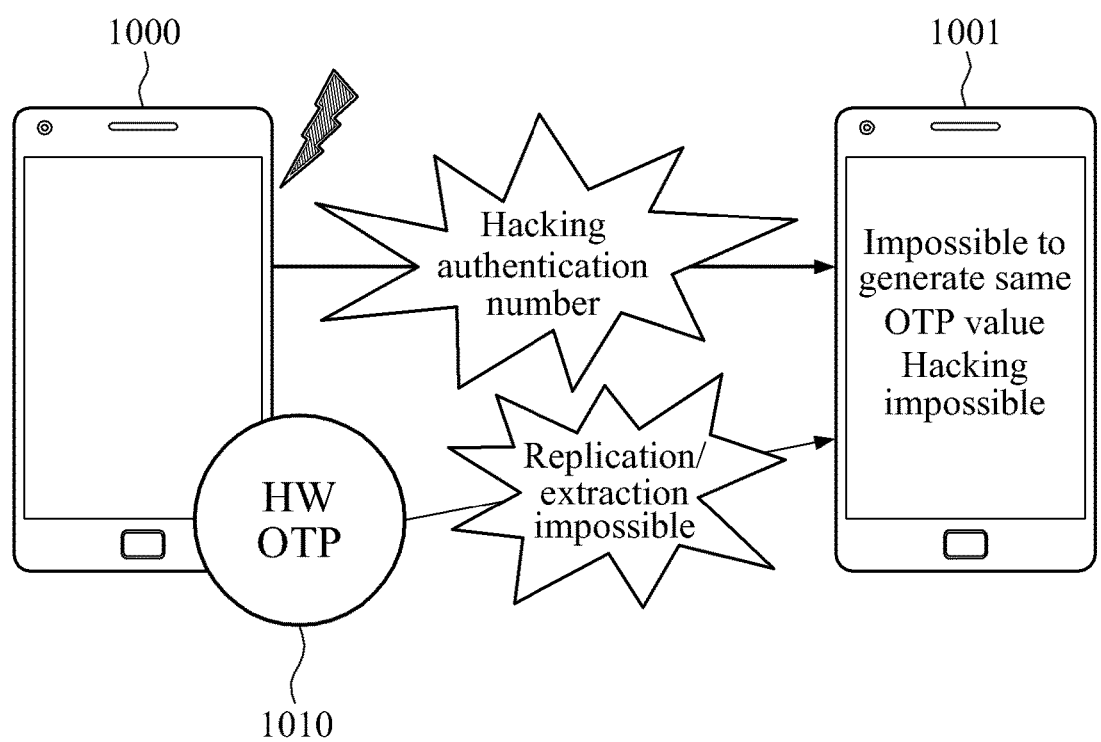
FIG. 10 illustrates an example of safety of an HW OTP authentication according to an example embodiment.

FIG. 10 illustrates an example of safety of an HW OTP authentication according to an example embodiment.

A probability that an authentication number provided to a terminal 1000 is extorted through a hacking may be present in an authentication process based on an authentication number, for example, a one-time authentication number including four or six digits, commonly used in a small sum payment in general.

As an example, a hacking tool or a malignant code may be installed in the terminal 1000 to extort the authentication number through, for example, a screen hacking and a key input hacking. The extorted authentication number may be used in an authentication process performed in another terminal 1001.

However, replication of an HW OTP 1010 may be impossible. Also, a proper OTP value may be generated only in the terminal 1000 including the HW OTP 1010 and thus, a high security level may be ensured.

As described above, since the OTP value generated by the HW OTP 1010 is not output through, for example, a display of the terminal 100 and seamlessly transmitted to a certificate authority through a safe encryption, the authentication process may not be affected by the screen hacking and the key input hacking. In this example, an individual may not recognize the generated OTP value during the authentication process.

Furthermore, in this example, the aforementioned typical authentication based on a common authentication number and the authentication using the HW OTP 1010 may be performed simultaneously. Thus, although the 2-factor authentication is performed in practice, a user may recognize a scheme using the authentication number and may not recognize the OTP authentication process. Accordingly, a user convenience may be improved and the user may be aware of a trivial difference when compared to the typical authentication process.

Figure 11:
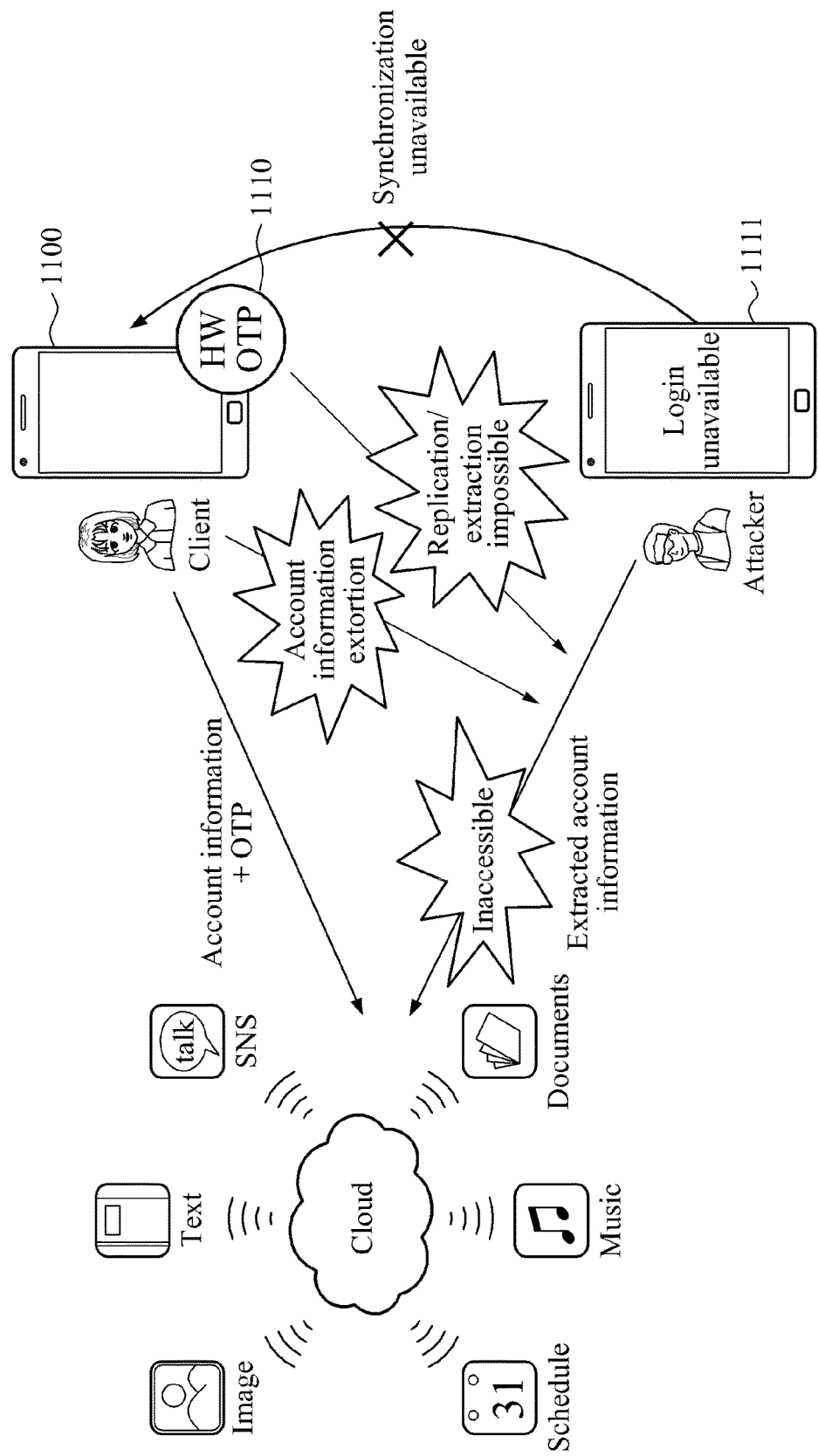
FIG. 11 illustrates another example of safety of an HW OTP authentication according to an example embodiment.

FIG. 11 illustrates another example of safety of an HW OTP authentication according to an example embodiment.

An authentication process of an HW OTP 1110 according to example embodiments may be used in transactions such as a financial trade and an electronic payment, and an account login process of a website or a cloud service.

In an example of a cloud service illustrated herein, an authentication may be performed in a terminal 1100 using the HW OTP 1110 in addition to and/or alternatively to a typical account information authentication based on, for example, e-mail, account identification (ID), password input. In this example, although an account theft is attempted in a terminal 1111 through an extortion of the account information, an account access of the terminal 1111 may not be allowed. The foregoing example may be based on a case in which the terminal 1111 may not be allowed to perform the OTP authentication since the replication of the HW OTP 1110 is impossible.

In terms of a cloud service, a user may store private photographs through synchronization, or important documents for business, schedules, and a social networking service (SNS) history may also be stored through the synchronization. Thus, through the account theft, an attacker may extort such information by performing synchronization or download.

Accordingly, the HW OTP authentication may prevent an account theft, thereby increasing a service reliability.

Figure 12:
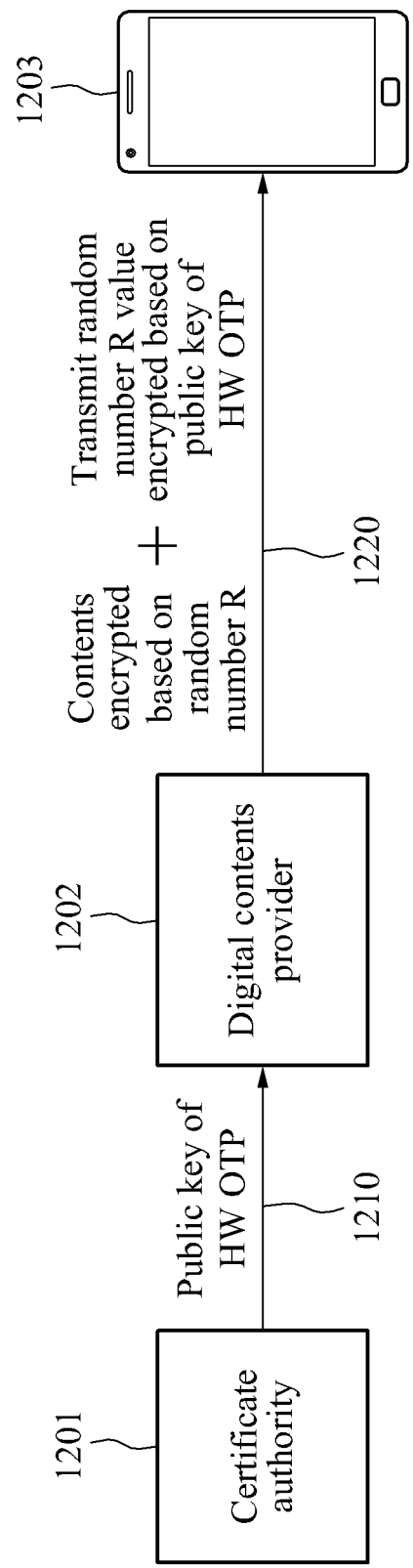
FIG. 12 illustrates an example of a method of applying an HW OTP authentication to a digital rights management (DRM) according to an example embodiment.

FIG. 12 illustrates an example of a method of applying an HW OTP authentication to a digital rights management (DRM) according to an example embodiment.

An HW OTP authentication according to example embodiments may also be applied to a contents copyright management such as a DRM in an online contents trade.

In operation 1210, a device 1201 of a reliable certificate authority such as a TSM may provide an HW OTP public key of a device 1203 when contents transmission is to be performed between a digital contents provider 1202 and the device 1203. As illustrates with reference to FIGS. 6 and 7, the foregoing example may be based on a case in which the public key is used in data or information encryption and there is no probability that may be disguised as the terminal 1203 when a private key for demodulation is absent.

To apply purchased digital contents, contents related to the DRM may need to be encrypted and decrypted. In a process of the encrypting and decrypting, a secret key scheme may be used for efficiency of encryption and decryption.

Thereafter, the digital contents provider 1202 may encrypt the contents based on a random number R, and transmit the random number R used to decrypt the encrypted contents based on the public key in operation 1220.

In this example, only the private key of the terminal 1203 may be allowed to decrypt the random number R used by the digital contents provider 1220 for the contents DRM. Thus, the secret key may be restored to decrypt the contents in the terminal 1203.

Figure 13:
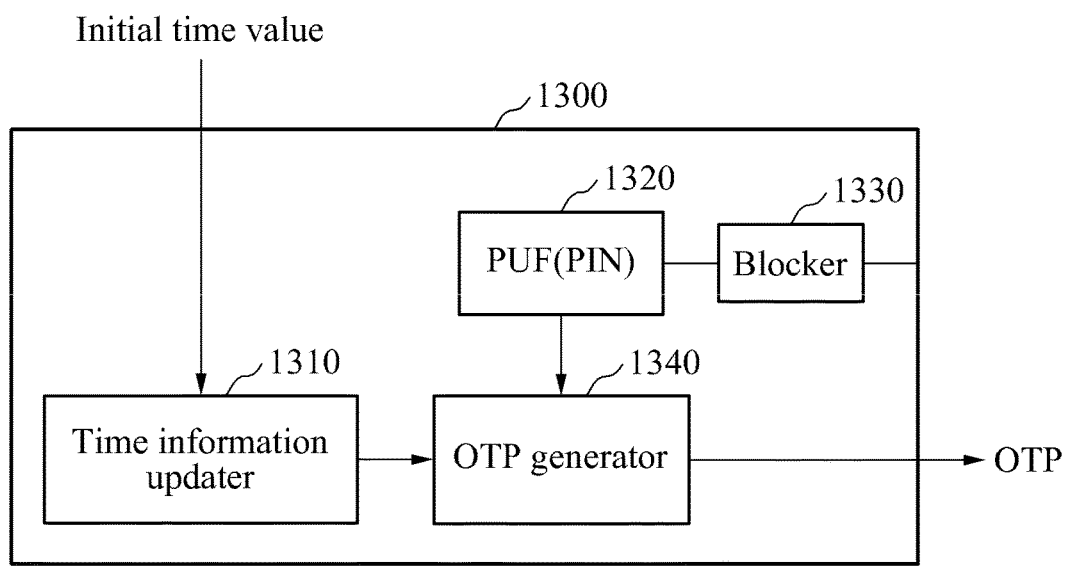
FIG. 13 illustrates an example of a time synchronization based HW OTP providing apparatus according to an example embodiment.

FIG. 13 illustrates an example of a time synchronization based HW OTP providing apparatus according to an example embodiment.

Although the foregoing descriptions are provided based on an example of an HW OTP performing an OTP authentication using a challenge-response scheme, this disclosure is not limited thereto.

In an example, an apparatus 1300 for generating an OTP through hardware based on a PUF may generate an OTP through an update performed by receiving an initial time value based on a time synchronization scheme.

In this example, a time information updater 1310 may update the initial time value at a predetermined time interval, for example, at an interval of one minute, and provide the updated initial time value to an OTP generator 1340.

When a request for an OTP authentication is received from an external source, the OTP generator 1340 may provide an OTP by generating the OTP based on the time information and a unique PIN of the apparatus 1300 provided from PUF(PIN) 1320.

After the PIN is initially extracted and safely registered, a blocker 1330 may physically block the PIN from the external source.

Figure 14:
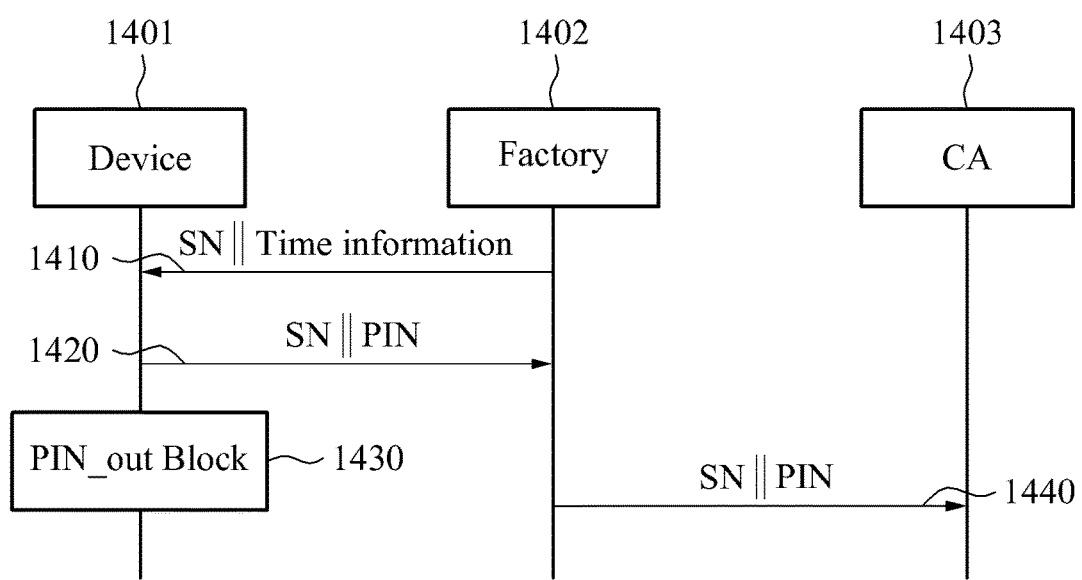
FIG. 14 is a flowchart illustrating a process of initially extracting a PIN from an HW OTP of FIG. 13.

FIG. 14 is a flowchart illustrating a process of initially extracting a PIN from the HW OTP 1300 of FIG. 13.

In operation 1410, time synchronization information, for example, an initial time value, and a serial number, SN of a device 1401 may be assigned to the device 1401 in a factory 1402 for manufacturing the device 1401.

In operation 1420, the device 1401 may provide SN and a unique PIN provided from PUF(PIN) to the factory 1402. After an initial extraction, PIN_out may be blocked in operation 1430.

In operation 1440, the factory 1402 may provide SN and PIN to a CA 1403 through a safe process. The CA 1403 may manage SN and PIN through a matching so as to use SN and PIN in a subsequent OTP authentication performed on the device 1401 based on the time synchronization scheme. As described above, the CA 1403 may perform the process performed in the factory 1402 when SN∥PIN is to be transmitted to the CA 1403 with an increased safety.

Figure 15:
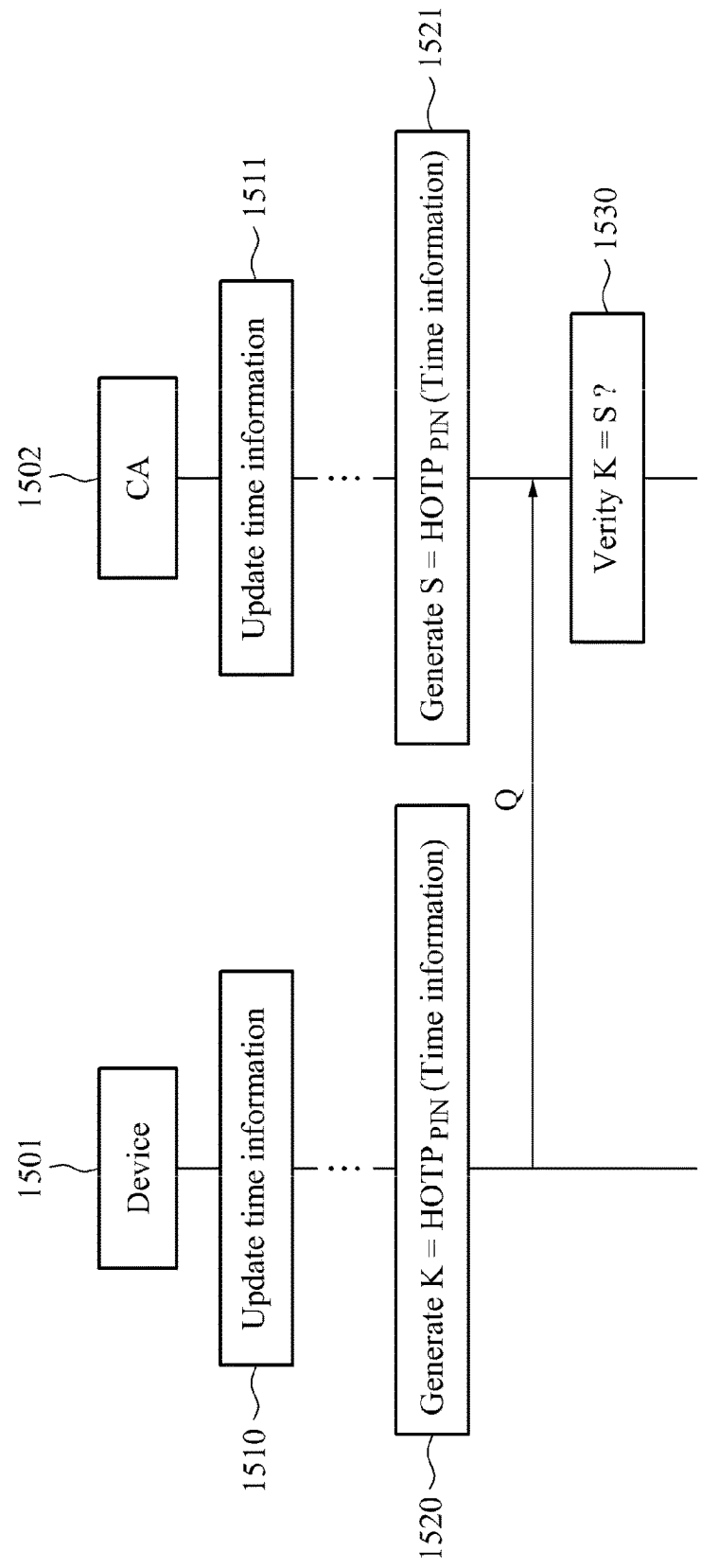
FIG. 15 is a flowchart illustrating a process of generating an OTP in an HW OTP providing apparatus of FIG. 13 and authenticating the generated OTP in a CA according to an example embodiment.

FIG. 15 is a flowchart illustrating a process of generating an OTP in an HW OTP providing apparatus of FIG. 13 and authenticating the generated OTP in a CA.

Each of a device 1501 and a CA 1502 may update synchronized time information through operations 1510 and 1511. When an OTP authentication is necessary, in operation 1520, the device 1510 may generate an OTP K based on the updated time information and a PIN of the device 1501. Thereafter, K may be safely encrypted as Q to be transferred to the CA 1502, and then decrypted to be K again.

In operation 1530, the CA 1502 may perform verification through a comparison between K and S autonomously generated based on the time information and the PIN of the device 1501 in operation 1521, thereby performing an OTP-based authentication on the device 1501.

The foregoing descriptions related to implementation and operation of an HW OTP may be provided with reference to FIGS. 13 through 15 as an example and thus, it is apparent that various examples are applicable thereto.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Therefore, the scope of the invention is defined not by the detailed description of the invention but by the appended claims, and all differences within the scope will be construed as being included in the present invention.

The invention claimed is:

1. An authentication apparatus comprising:
a secure element to perform a first authentication process;
a hardware-based one-time password (OTP) generation element disposed on a chip separate from the secure element and having a die-chip wiring with the secure element, the OTP generation element comprising a physically unclonable function (PUF) to generate an OTP, perform a second authentication process, and transmit the OTP externally through an input and output interface of the secure element;
wherein the secure element provides an only access to the hardware-based OTP generation element to prevent external access to the hardware-based OTP generation element.

2. The apparatus of claim 1, wherein when a random number encrypted using a public key of the hardware-based OTP generation element is received from a certificate authority, the hardware-based OTP generation element decrypts the random number using a private key corresponding to the public key and generated based on the PUF, and generates the OTP using the decrypted random number.

3. The apparatus of claim 2, wherein when the public key is transmitted to the certificate authority, the hardware-based OTP generation element encrypts the public key using a PUF-personal identification number (PIN) differing from the PUF and transmits the encrypted public key.

4. The apparatus of claim 3, wherein the hardware-based OTP generation element comprises a blocker used to extract the PUF-PIN before the authentication apparatus performs the second authentication process and is physically blocked after the extracting such that the PUF-PIN is not re-extracted.

5. The apparatus of claim 1, wherein the authentication apparatus is implemented in at least one of a subscriber identification module (SIM), a storing medium, and an internal chip of a terminal device, and the secure element provides a security storage to store at least one item of security information related to the first authentication.

6. The apparatus of claim 5, wherein the security information comprises at least one of an authentication certificate, a password, and subscriber identification information.

7. The apparatus of claim 1, wherein the second authentication relates to a submission of the OTP requested from at least one of a trusted service manager (TSM), a mobile network operator (MNO), a contents provider, and a service provider.

8. The apparatus of claim 1, wherein at least one of a first authentication and a second authentication is performed in connection with at least one of a mobile credit card payment, an electronic wallet payment, a mobile banking, an in-app store purchase payment, a content purchase payment, a website login, and a cloud computing service login.

9. A hardware-based one-time password (OTP) generation apparatus using a physically unclonable function (PUF), the apparatus comprising:
a first PUF to provide a private key;
a public key generator to generate a public key using the private key;
a second PUF to provide a personal identification number (PIN) for identifying the apparatus;
an encryptor to encrypt the public key using the PIN and provide the encrypted public key;

a decryptor to decrypt, using the private key, a random number received through an encryption performed using the public key; and an OTP generator to generate an OTP corresponding to the random number in response to a decryption of the random number.

10. The apparatus of claim 9, wherein the PIN is used to decrypt the public key, and wherein the hardware-based OTP generation apparatus further comprises a blocker used to initially extract the PIN and is physically blocked after the PIN is initially extracted such that the PIN is not exposed externally.

11. A hardware-based one-time password (OTP) generation apparatus using a physically unclonable function (PUF), the apparatus comprising:

a PUF to provide a personal identification number (PIN) for identifying the apparatus;

a storage to store time information synchronized with an external source;

an OTP generator to generate, in response to an OTP provision request, an OTP corresponding to the time information based on the PIN and the time information;

a blocker used to initially extract the PIN and is physically blocked after the PIN is initially extracted such that the PIN is not exposed externally.

12. An authentication method comprising:

transmitting, in response to a one-time password (OTP) provision request for a second authentication process differing from a first authentication process performed by a secure element, the OTP provision request from the secure element to a hardware-based OTP generation element which comprises a physically unclonable function (PUF) and is provided as a single package through a die-chip wiring with the secure element;

generating, by the hardware-based OTP generation element, an OTP using the PUF and transmitting the OTP to the secure element; and externally providing, by the secure element, the OTP through an input and output interface of the secure element.

13. The method of claim 12, wherein the hardware-based OTP generation element decrypts a random number received in response to the OTP provision request and encrypted using a public key of the hardware-based OTP generation element, based on a private key generated using the PUF, and generates the OTP using the decrypted random number.

14. The method of claim 12, wherein when a public key of the hardware-based OTP generation element is exchanged with an external source, the public key is encrypted using a PUF-personal identification number (PIN) differing from the PUF to be transmitted.

15. The method of claim 14, further comprising:

physically blocking an interface through which the PUF-PIN is externally exposed in advance of performing the authentication method.

16. An authentication method for providing a one-time password (OTP) using a hardware-based OTP generation apparatus based on a physically unclonable function (PUF), the method comprising:

generating a public key using a private key generated by a first PUF;

providing, by a second PUF, a personal identification number (PIN) for identifying the hardware-based OTP generation apparatus;

encrypting, by an encryptor, the public key using the PIN and providing the encrypted key;

decrypting, by a decryptor, using the private key, a random number received through an encryption based on the public key; and generating, by an OTP generator, an OTP corresponding to the random number in response to a decryption of the random number.

17. An authentication method for providing a one-time password (OTP) using a hardware-based OTP generation apparatus based on a physically unclonable function (PUF), the method comprising:

generating, by a PUF, a personal identification number (PIN) for identifying the hardware-based OTP generation apparatus;

physically blocking, with a hardware blocker, extraction of the PIN from the hardware-based OTP generation apparatus; and generating, by an OTP generator, an OTP corresponding to time information synchronized with an external source based on the PIN and the time information in response to an OTP provision request.

* * * * *